US008016511B2

(12) United States Patent
Pamminger

(10) Patent No.: US 8,016,511 B2
(45) Date of Patent: Sep. 13, 2011

(54) METALLIC STRUCTURAL PART JOINED FROM AT LEAST TWO COMPONENTS

(75) Inventor: Helmut Pamminger, Vöcklabruck (AT)

(73) Assignee: Miba Sinter Austria GmbH, Laakirchen (AT)

( * ) Notice: Subject to any disclaimer, the term of this patent is extended or adjusted under 35 U.S.C. 154(b) by 571 days.

(21) Appl. No.: 11/109,081

(22) Filed: Apr. 19, 2005

(65) Prior Publication Data

US 2006/0112779 A1   Jun. 1, 2006

(30) Foreign Application Priority Data

Nov. 19, 2004   (AT) ................... A 1943/2004

(51) Int. Cl.
*F16D 1/072*   (2006.01)
(52) U.S. Cl. ................... 403/282; 403/332; 74/431
(58) Field of Classification Search ............ 29/505, 29/522, 525.01, 525.05, 522.1; 403/282, 403/332, 355, 357, 359.1, 359.5, 375; 74/333, 74/431; 192/69, 69.91
See application file for complete search history.

(56) References Cited

U.S. PATENT DOCUMENTS

| | | | | |
|---|---|---|---|---|
| 1,433,860 A | * | 10/1922 | Spencer | 403/267 |
| 2,825,080 A | * | 3/1958 | Bongiovanni | 401/288 |
| 2,877,732 A | * | 3/1959 | Eaton | 114/22 |
| 3,374,014 A | * | 3/1968 | Kull et al. | 403/332 |
| 3,426,657 A | * | 2/1969 | Bimba | 92/255 |
| 3,520,561 A | * | 7/1970 | Rininger | 285/24 |
| 5,531,305 A | * | 7/1996 | Roberts et al. | 192/53.332 |
| 5,626,214 A | * | 5/1997 | Schlaich et al. | 192/53.34 |
| 6,145,640 A | * | 11/2000 | Schwuger et al. | 192/53.34 |

FOREIGN PATENT DOCUMENTS

EP   1 375 969 A2   1/2004
JP   2003291904   * 10/2003

* cited by examiner

*Primary Examiner* — Daniel P Stodola
*Assistant Examiner* — Nahid Amiri
(74) *Attorney, Agent, or Firm* — Collard & Roe, P.C.

(57) ABSTRACT

A metallic structural part is described which is joined from at least two components (1, 2), of which one component (1) comprises a hub-like nose (3) for receiving the other annular component (2) without play, which is placed on the nose (3) so as to be stopped there and is secured against axial withdrawal by a latching ring which engages in a circular latching recess (8) of one of the two components (1, 2). In order to provide simple constructional conditions it is proposed that the latching ring engaging in the latching recess (8) of the one component (1) consists of a radially projecting ring segment (7) of the other component (2) and that the radial projecting portion (r) of the ring segment (7) corresponds at most to the magnitude of the maximum elastic deformation of the ring segment (7) in the radial direction.

2 Claims, 1 Drawing Sheet

METALLIC STRUCTURAL PART JOINED FROM AT LEAST TWO COMPONENTS

FIELD OF THE INVENTION

The invention relates to a metallic structural part which is joined from at least two components, of which one component comprises a hub-like nose for receiving the other annular component without play, which is placed on the nose so as to be stopped there and is secured against axial withdrawal by a latching ring which engages in a circular latching recess of one of the two components.

DESCRIPTION OF THE PRIOR ART

In order to secure two components against each other in the axial direction, namely a gearwheel and a clutch ring which is pushed onto a hub-like nose so as to be stopped there, it is known (EP 1 375 969 A2) to provide a circular groove for receiving a latching ring in the region of the hub-like nose averted from the stop, with the help of which the clutch ring is held in contact with a shoulder of the gearwheel forming a limit stop. In order to secure contact without play, the latching ring which is made of a ductile material is caulked with the help of a caulking tool under plastic deformation in an interlocking manner in the circumferential groove of the hub-like nose, so that the caulked latching ring forms a latching body engaging in an interlocking manner in a latching recess formed by a circumferential groove, which latching body prevents an axial withdrawal of the clutch ring from the hub-like nose of the gearwheel without having to build up radial tensions between the components which are mutually fixed in the axial direction. The disadvantageous aspect in this known construction is the complexity of the construction which is caused by the separate latching ring. The latching ring needs to be introduced at first into the circumferential groove in a loose fashion before it can be caulked in an interlocking manner in the circumferential groove.

SUMMARY OF THE INVENTION

The invention is thus based on the object of providing a metallic structural part as joined from at least two components and as described above in such a way that the two components can be fixed relative to each other in the axial direction without having to build up radial tensions between the components.

This object is achieved by the invention in such a way that the latching ring engaging in the latching recess of the one component consists of a radially projecting ring segment of the other component and that the radial projecting portion of the ring segment corresponds at most to the magnitude of the maximum elastic deformation of the ring segment in the radial direction.

Since as a result of these measures the latching ring is formed by a ring segment of one of the two components and said ring segment comprises a radial projecting portion which on joining the two components limits the deformation of the components in the region of the ring segment to a substantially elastic region, the ring segment assumes its initial shape again after its relief in the region of the latching recess of the respective other component, in which it projects via the seat of the component with the latching recess into the same and therefore mutually latches the components, without any extra constructional efforts. It is merely necessary to push the annular component with a respective axial force onto the hub-like nose of the other component up to the limit stop.

Although both components can be provided in an alternating fashion with the circular latching recess and the ring segment engaging in said latching recess, especially simple constructional conditions are obtained when the annular component forms the radially projecting ring segment because generally a more favorable elastic behavior is obtained for this annular component in connection with the widening that occurs during the joining.

In order to avoid the influence of production tolerances on the mutual positional coordination of the ring segment and the latching recess of the components to be joined towards a mutual axial fixation of the components which is free from play, the ring segment of the one component can axially project beyond the latching recess of the other component on the side averted from the axial limit stop, so that in any case axial play between the ring segment and the recess is avoided on the side averted from the limit stop. The lapping can be limited to a magnitude without any difficulties which does not lead to any disadvantage concerning the axial securing or the radial loading of the components.

Since the joining of the two components is linked to an elastic deformation in the region of the ring segment of the one component as a result of the measures in accordance with the invention and the required radial forces will become effective between the components, it is recommended to form the ring segment of the one component forming the latching ring on the side facing the axial limit stop with a run-up incline, so that the sliding into each other of the two components is facilitated by a simultaneous elastic deformation of the ring segment.

BRIEF DESCRIPTION OF THE DRAWINGS

The subject matter of the invention is shown in the drawings by way of example, wherein.

DESCRIPTION OF THE PREFERRED EMBODIMENT

Figure 1:
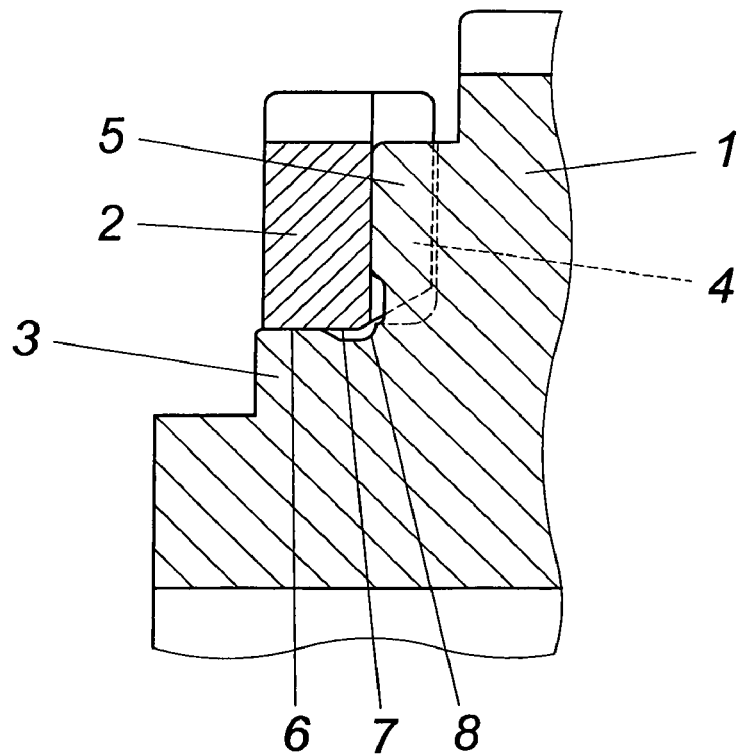
FIG. 1 shows a structural part in accordance with the invention in the form of a gearwheel in a sectional axial view.
Figure 2:
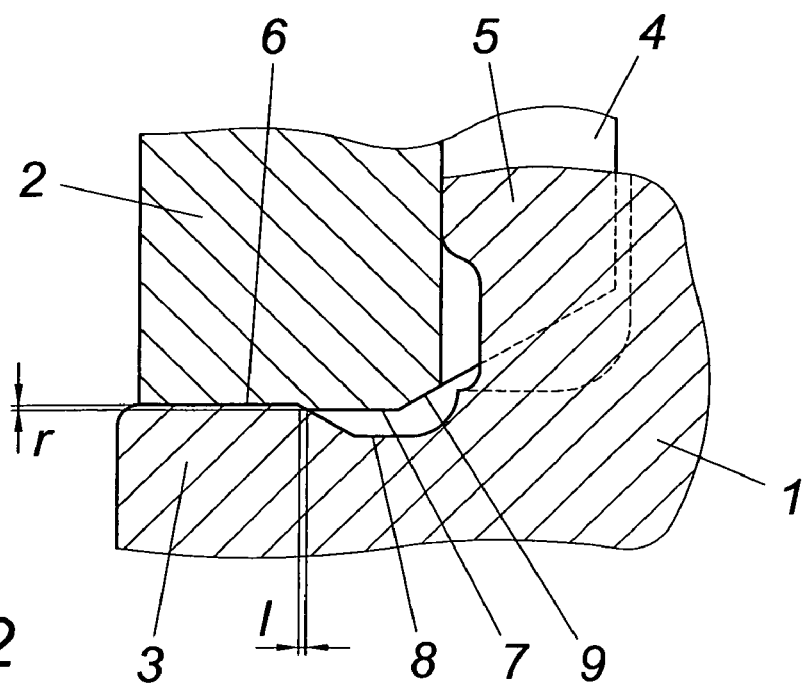
FIG. 2 shows an axial sectional view through the joining region between the two components of said structural part on an enlarged scale.

The structural part, which in the embodiment is a gearwheel, is joined of two components 1, 2, namely a toothed wheel and a clutch ring, with the component 1 forming the toothed wheel forming a hub-like nose 3 on which the annular component 2 (i.e. the clutch ring) sits. For the transmission of torque between the components 1 and 2, they comprise gearings 4, 5 on the face side, which also lead to an axial stop between the components 1 and 2. In order to prevent a withdrawal of the component 2 from the hub-like nose 3 of component 1, the annular component 2 is provided with a ring segment 7 which projects radially beyond the seating surfaces 6 between the components 1 and 2 and whose radial projecting portion r corresponds at most to the magnitude of the maximum elastic deformation of the ring segment 7 in the radial direction. The ring segment 7 cooperates with a circular latching recess 8 of the component 1, into which it engages according to the projecting portion r and thus prevents an axial withdrawal of the annular component 2 from the hub-like nose 3 of component 1 without having to build up radial tensions between the components 1 and 2. The torque between the components 1 and 2 can thus be transmitted exclusively via the gearings 4 and 5 on the face side.

Since the projecting portion r of the ring segment 7 lies in the elastic deformation region of the component 2, the ring segment 7 is merely subjected to an elastic deformation when sliding component 2 on the hub-like nose 3, which deformation is reversed when the ring segment 7 is relieved in the region of the latching recess 8, which leads to the interlocking latching engagement of the ring segment 7 in the latching recess 8 and thus to the axial securing of the annular component 2 on the hub-like nose 3. The ring segment 7 is provided with a run-up incline 9 on the face side facing the axial limit stop in order to facilitate the sliding of the annular component 2 onto the hub-like nose 3 under an elastic deformation of the ring segment 7.

Due to the requirement that the axial securing of the annular component 2 on the hub-like nose 3 of component 1 should not occur through a press fit, an axial play between the ring segment 7 and the circumferential edge of the latching recess 8 averted from the limit stop could endanger the play-free axial contact of the component 1 on component 2 via the gearings 4, 5. In order to ensure such a play-free contact irrespective of production tolerances, the ring segment 7 on the side averted from the axial limit stop can project beyond the latching recess 8 in the axial direction. The lapping length l can always be chosen sufficiently small in order to impair through such lapping neither the tension-free radial support of component 2 nor the axial securing of the components.

The invention claimed is:

1. A metallic structural part comprising
   (a) a first component comprising a hub-shaped nose, a circular latching recess and an axial limit stop; and
   (b) a second annular component joined to said first component, said second annular component comprising a first annular portion and a second portion, said first annular portion directly engaging the hub-shaped nose and projecting beyond the circular latching recess in a direction away from the axial limit stop, said second portion being stopped by the axial limit stop and comprising a radially projecting ring segment, the radially projecting ring segment projecting further in a radially inwards direction than an adjacent region of the first annular portion projects in the radially inwards direction, the adjacent region of the first annular portion being adjacent to the radially projecting ring segment;
   wherein the hub-shaped nose receives said second annular component without play;
   wherein the radially projecting ring segment engages into the circular latching recess at a radial depth of penetration into the circular latching recess to secure the second annular component against axial withdrawal;
   wherein the radially projecting ring segment has a maximum elastic deformation of a selected magnitude in a radial direction; and
   wherein the radial depth of penetration of the radially projecting ring segment corresponds at most to the selected magnitude of the maximum elastic deformation of the radially projecting ring segment in the radial direction.

2. The metallic structural part according to claim 1, wherein the radially projecting ring segment is provided with a run-up incline on a side facing the axial limit stop.

* * * * *